(12) United States Patent
Memetla Martinez et al.

(10) Patent No.: US 10,308,151 B2
(45) Date of Patent: Jun. 4, 2019

(54) ARMREST ASSEMBLY AND UNITARY ARMREST SUBASSEMBLY HAVING A SUPPORT SUBSTRATE AND RESILIENT WEB SECURED TOGETHER BY MECHANICAL FASTENING FEATURE

(71) Applicant: FORD GLOBAL TECHNOLOGIES, LLC, Dearborn, MI (US)

(72) Inventors: Humberto Memetla Martinez, Mexico City (MX); Leonel de Jesus Perez Sandoval, Toluca (MX)

(73) Assignee: Ford Global Technologies, LLC, Dearborn, MI (US)

(*) Notice: Subject to any disclaimer, the term of this patent is extended or adjusted under 35 U.S.C. 154(b) by 16 days.

(21) Appl. No.: 15/484,802

(22) Filed: Apr. 11, 2017

(65) Prior Publication Data

US 2018/0290571 A1    Oct. 11, 2018

(51) Int. Cl.
*B60N 2/75*     (2018.01)
*B68G 7/12*     (2006.01)
*A47C 7/54*     (2006.01)

(52) U.S. Cl.
CPC ............ *B60N 2/75* (2018.02); *A47C 7/54* (2013.01); *B68G 7/12* (2013.01)

(58) Field of Classification Search
CPC ............. B60N 2/75; A47C 7/54; B68G 7/12

USPC ...... 296/1.09; 297/440.22, 440.1, 440.2, 227, 297/452.38
See application file for complete search history.

(56) References Cited

U.S. PATENT DOCUMENTS

| | | | |
|---|---|---|---|
| 3,362,749 A * | 1/1968 | Clement ............... | B60N 2/78 297/411.21 |
| 4,331,360 A * | 5/1982 | Roudybush ............. | A47C 5/12 108/901 |
| 5,064,247 A * | 11/1991 | Clark .................... | A47C 3/04 297/232 |
| 7,775,584 B2 | 8/2010 | Hughes, Jr. et al. | |
| 8,632,117 B1 | 1/2014 | Sanchez Cruz et al. | |
| 2005/0186388 A1 | 8/2005 | Mekas et al. | |
| 2007/0069548 A1 | 3/2007 | Dooley et al. | |
| 2010/0133866 A1 | 6/2010 | Hipshier | |
| 2014/0021733 A1 | 1/2014 | Hipshier et al. | |
| 2015/0258939 A1 | 9/2015 | Hipshier et al. | |

* cited by examiner

*Primary Examiner* — Milton Nelson, Jr.
(74) *Attorney, Agent, or Firm* — Vichit Chea; King & Schickli, PLLC

(57) ABSTRACT

An armrest assembly includes a unitary armrest subassembly having a support substrate and a resilient web secured together by a mechanical fastening feature. The armrest subassembly also includes a cushion overlying the resilient web and a coverstock concealing the cushion and the resilient web and enclosing the receiver in the unitary armrest subassembly that holds those components.

6 Claims, 5 Drawing Sheets

ARMREST ASSEMBLY AND UNITARY ARMREST SUBASSEMBLY HAVING A SUPPORT SUBSTRATE AND RESILIENT WEB SECURED TOGETHER BY MECHANICAL FASTENING FEATURE

TECHNICAL FIELD

This document relates generally to the motor vehicle equipment field and, more particularly, to a new and improved armrest assembly as well as to a method of making that armrest assembly.

BACKGROUND

In the past, an armrest assembly A has been made from five component parts (see FIG. 1). Those component parts include a substrate support S typically molded from a resin material. A fabric frame FF is separately molded from a resin material and mounted on the support substrate S. A fabric layer F is then attached to the fabric frame FF. A cushion C made from foam or other appropriate material is then provided on the support substrate overlying the fabric layer F. An A-surface of coverstock CS is then secured to the support substrate S concealing and overlying the cushion C, the fabric F and the fabric frame FF.

This document relates to a new and improved armrest assembly that includes only four components. More specifically, the separate fabric frame FF used in the prior art armrest assembly illustrated in FIG. 1 is eliminated. As a result, the new and improved armrest assembly eliminates the manufacturing steps of separately molding the fabric frame and mounting the fabric frame to the support substrate. Accordingly, the new and improved armrest assembly may be made by a more efficient production method that reduces production costs and production time.

SUMMARY

In accordance with the purposes and benefits described herein, a new and improved armrest assembly is provided. That armrest assembly comprises a unitary armrest subassembly that includes a support substrate and a resilient web secured together by a mechanical fastening feature. More specifically, the support substrate has a receiver and a retention feature and the resilient web extends across the receiver and has an integral fastener captured in the retention feature. The armrest also includes a cushion overlying the resilient web and a coverstock concealing the cushion and the resilient web while also enclosing the receiver.

The receiver may include an inset shoulder. That inset shoulder may outline a relief opening in the bottom wall of the receiver. A plurality of tabs may project from the inset shoulder. The retention feature may be carried on the plurality of tabs.

The integral fastener may comprise a shaft and an enlarged head. The retention feature engages the shaft which is captured in the retention feature by the enlarged head.

In accordance with an additional aspect, an armrest subassembly is provided. That armrest subassembly is unitary in construction and comprises (a) a support substrate having a receiver and (b) a retention feature and a resilient web. That resilient web extends across the receiver and has an integral fastener captured in the retention feature. The receiver may include an inset shoulder. That inset shoulder may outline a relief opening in the receiver.

The armrest subassembly may further include a plurality of tabs projecting from the inset shoulder. The retention feature may be carried on the plurality of tabs and/or the inset shoulder. In addition, the integral fastener may comprise a shaft and an enlarged head. The retention feature engages the shaft which is captured in the retention feature by the enlarged head.

In accordance with yet another aspect, a method of manufacturing an armrest assembly is provided. That method comprises the steps of: (a) two-shot molding a unitary armrest subassembly including a support substrate and a resilient web secured together by a mechanical fastening feature, (b) positioning a cushion overlying the resilient web and (c) concealing the cushion and resilient web with a coverstock.

The method may further include the step of molding the support substrate from a first material having a first melting point. Further, the method may include the step of molding the resilient web from a second material having a second melting point wherein the first melting point is greater than the second melting point.

Still further, the method may include the step of molding the retention feature into the support substrate when molding the support substrate. Further, the method may include molding an integral fastener on the resilient web when molding the resilient web. In addition the method may include the step of providing the integral fastener with a shaft and an enlarged head. Further the method may include the step of capturing the shaft in the retention feature molded into the support substrate.

In the following description, there are shown and described several preferred embodiments of the armrest assembly, the armrest subassembly and the method of manufacturing that armrest subassembly. As it should be realized, the armrest assembly, the armrest subassembly and the method are capable of other, different embodiments and their several details are capable of modification in various, obvious aspects all without departing from the armrest assembly, the armrest subassembly and the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest assembly, the armrest subassembly and the production method and together with the description serve to explain certain principles thereof.

Reference will now be made in detail to the present preferred embodiments of the armrest assembly and the related production method, examples of which are illustrated in the accompanying drawing figures.

DETAILED DESCRIPTION

Figure 1:
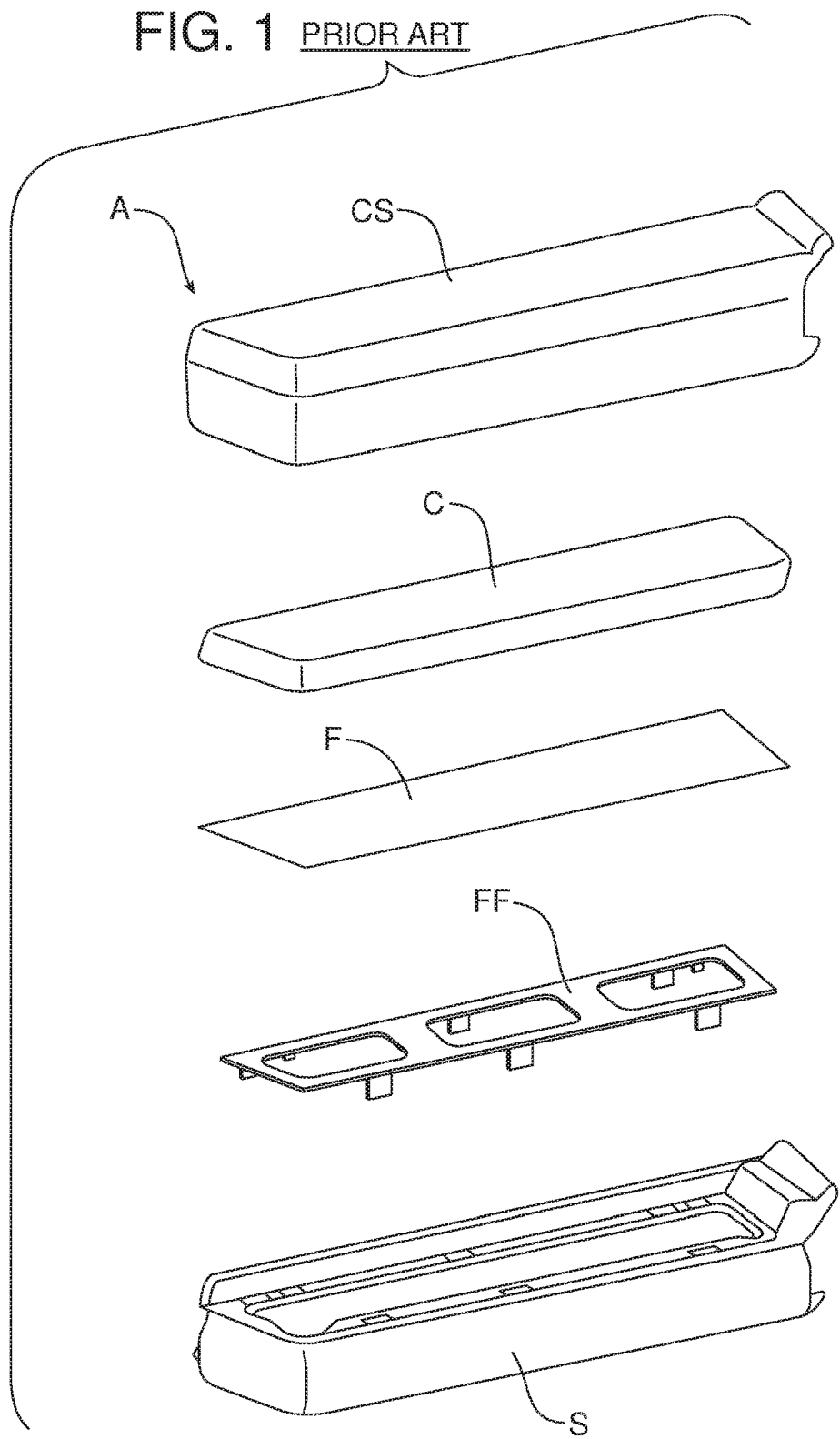
FIG. 1 is an exploded perspective view of a prior art armrest assembly incorporating five separate components.
Figure 2:
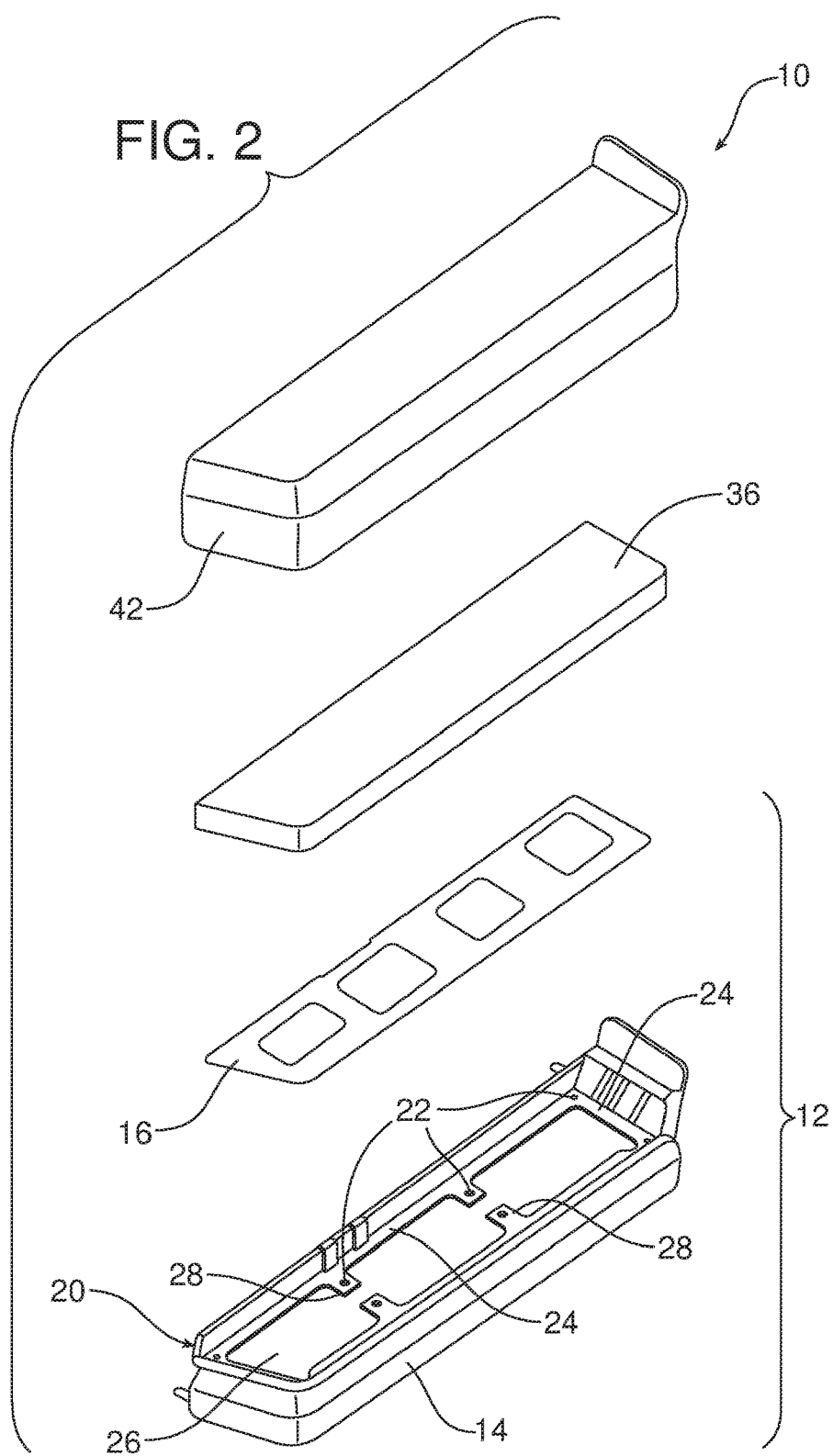
FIG. 2 is an exploded perspective view of the new and improved armrest assembly that is essentially equivalent to the prior armrest assembly illustrated in FIG. 1 but is easier and less expensive to manufacture and assemble.
Figure 3:
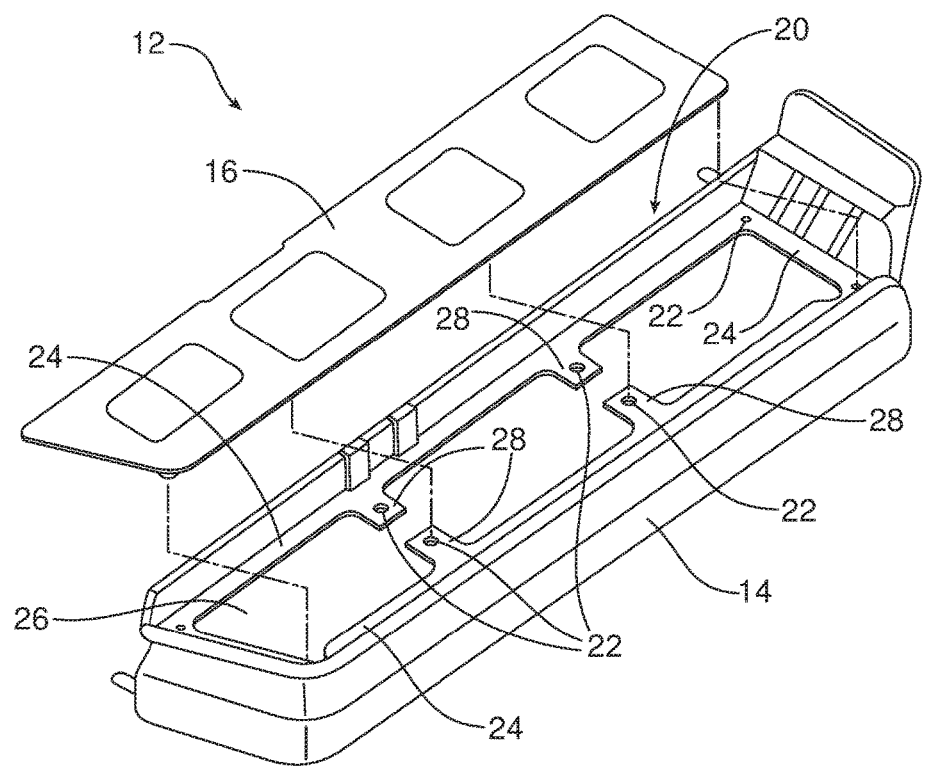
FIG. 3 is a detailed perspective view of the armrest subassembly used in the armrest assembly illustrated in FIG. 2.
Figure 4:
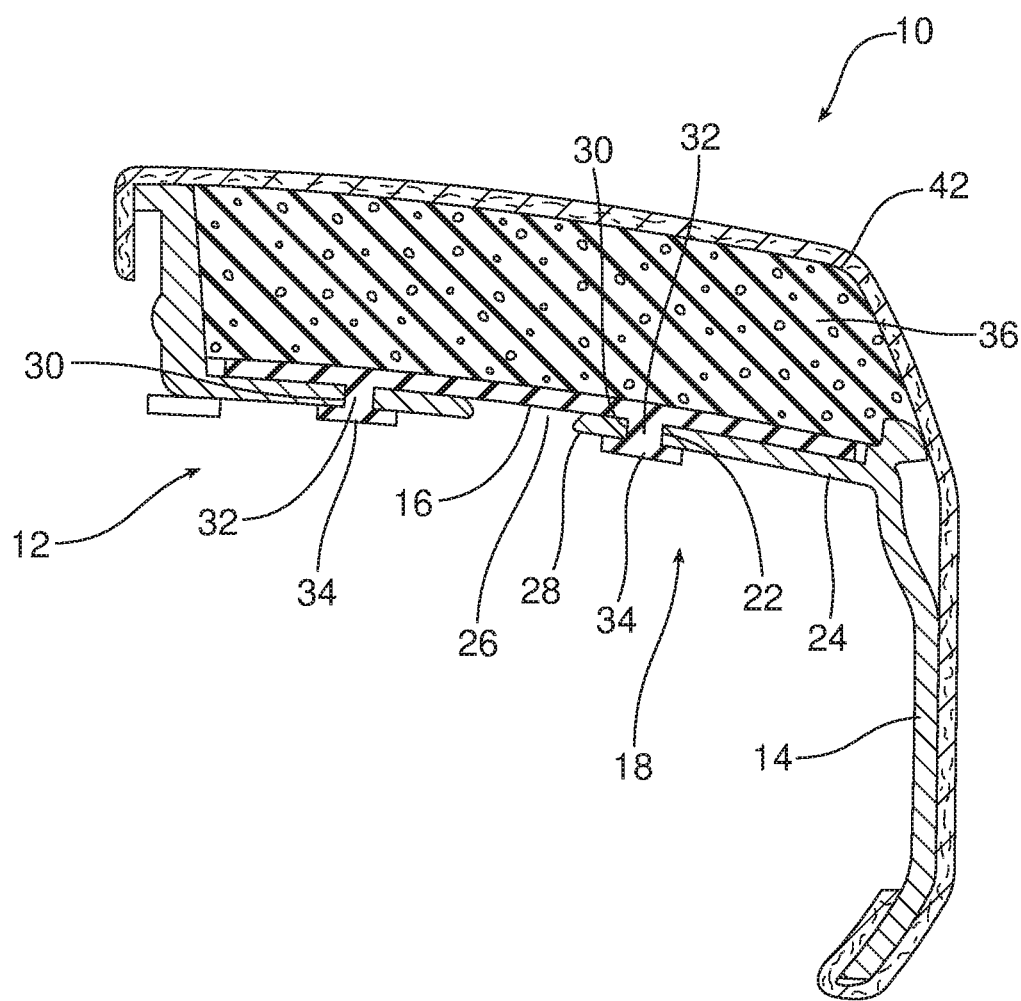
FIG. 4 is a cross sectional view of the assembled armrest assembly illustrated in FIG. 2.

Reference is now made to FIG. 2-4 illustrating the new and improved armrest assembly 10 and the new and improved unitary armrest subassembly 12. That armrest subassembly 12 includes a support substrate 14 and a resilient web 16 secured together by a mechanical fastening feature generally designated by reference numeral 18.

More specifically, the support substrate 14 includes a receiver 20 and a retention feature 22. The receiver 20 includes an inset shoulder 24 that, in the illustrated embodiment, extends continuously around and outlines a relief opening 26.

A plurality of tabs 28 on the inset shoulder 24 project inwardly into the relief opening 26. The retention feature 22, in the form of mounting apertures in the illustrated embodiment, is carried on the tabs 28 and the inset shoulder 24.

The resilient web 16 extends across the receiver 20 and has an integral fastener 30. In the illustrated embodiment, the integral fastener 30 comprises a plurality of shafts 32 having an enlarged head 34 at the distal end thereof.

As will be described in greater detail below, the unitary armrest subassembly 12 is manufactured by means of a two-shot molding process wherein the integral fasteners 30 are molded in place with the shafts 32 extending through the apertures/retention features 22 and the enlarged heads 34 functioning to capture the integral fasteners 30 in the retention features preventing the shafts 32 from pulling out. Thus, the two-shot molding process effectively provides a permanent attachment of the resilient web 16 to the support substrate 14.

As best illustrated in FIGS. 2 and 4, the armrest assembly 10 also includes a cushion 36 that overlies the resilient web 16. In the illustrated embodiment, the cushion 36 comprises a cushion layer of an appropriate soft foam, known in the art to be useful for this particular application.

In addition, the armrest assembly 10 includes a coverstock 42 that conceals the cushion 36 and the resilient web 16 while also enclosing the receiver 20. The coverstock 42 may be made from any appropriate material known in the art to be useful as an armrest A—surface covering including, for example, various fabrics, cloth, vinyl-coated fabric, leather and appropriate "soft-touch" materials.

Consistent with the above description, a new and improved method of manufacturing an armrest assembly 10 is provided. That method includes the step of two-shot molding a unitary armrest subassembly 12 which includes the support substrate 14 and the resilient web 16 secured together by the molded-in-place mechanical fastening feature 18. In addition, the method includes positioning the cushion 36 overlying the resilient web 16 in the receiver 20 of the armrest subassembly 12. Further, the method includes the step of concealing the cushion 36 and the resilient web 16 with a coverstock 42. The coverstock 42 may be attached to the support substrate 14 by an appropriate adhesive, mechanical fasteners or a combination of adhesive and fasteners. The completed and assembled armrest assembly 10 is illustrated in FIG. 4.

More specifically, the method may include the step of molding the support substrate 14 from a first material, such as acrylonitrile butadiene styrene (ABS) which has a first melting point. The resilient web 16 may be molded from a second material, such as thermoplastic elastomer (TPE), having a second melting point wherein the first melting point is greater than the second melting point.

As should be apparent from the previous description, the method may also include the step of molding the retention feature 22 into the tabs 28 of the support substrate 14 when molding the support substrate. Further, the method may include the step of molding the integral fastener 30 on the resilient web 16 when molding the resilient web.

Each integral fastener 30 is provided with a shaft 32 and an enlarged head 34 at the distal end of the shaft. Consequently the method further includes the step of capturing the shaft 32 in the retention feature 22 molded into the support substrate 14. The retention feature 22 and the integral fastener 30 function as an integral molded-in-place mechanical fastening feature 18 securing the resilient web 16 and the support substrate 14 together. Advantageously, the integral mechanical fastening feature 18 securing the support substrate 14 and the resilient web 16 together effectively eliminates the need to consider adhesion issues due to incompatibility between resins. Accordingly, engineers are free to select any materials necessary to optimize the performance of the support substrate 14 and resilient web 16 of the armrest subassembly 12 and thereby produce an improved overall product.

Figure 5:
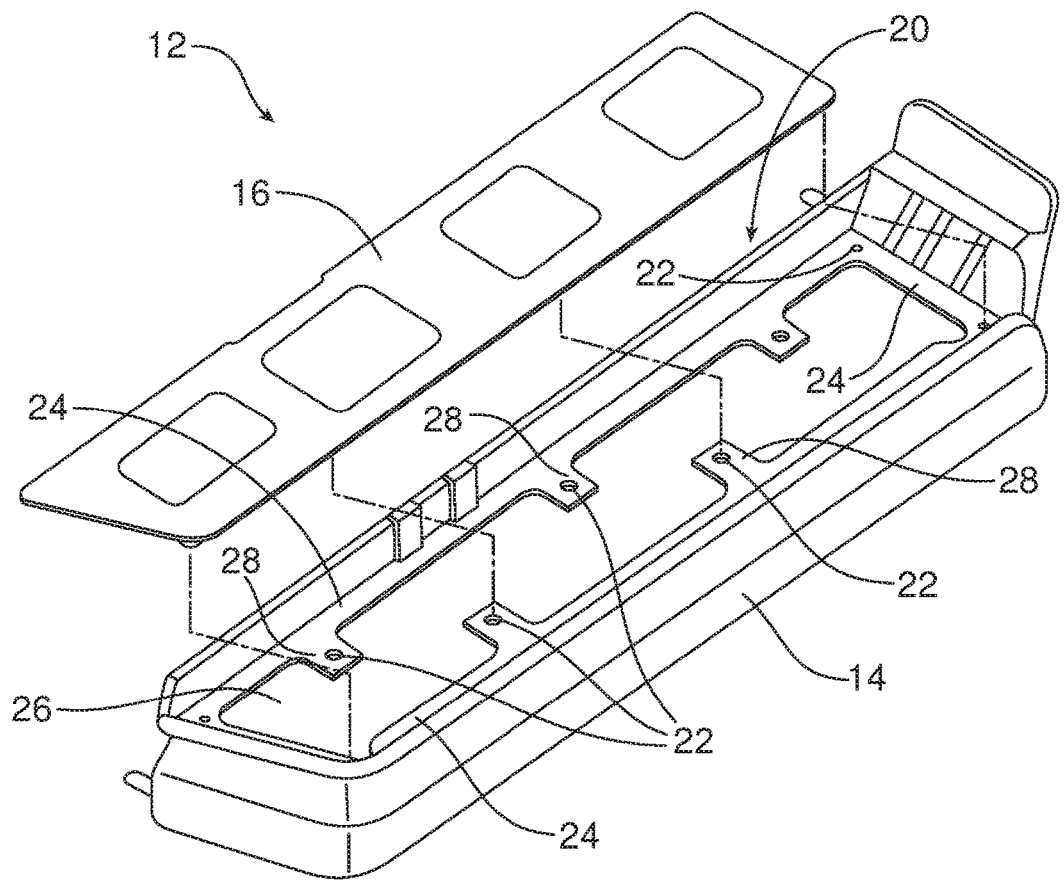
FIG. 5 is an exploded perspective view of an alternative embodiment including offset or staggered tabs.

The foregoing has been presented for purposes of illustration and description. It is not intended to be exhaustive or to limit the embodiments to the precise form disclosed. Obvious modifications and variations are possible in light of the above teachings. For example, the tabs 28 on the inset shoulder 24 of the embodiment illustrated in FIGS. 2 and 3 are opposed. Those tabs 28 could also be offset or staggered if desired. See FIG. 5. Similarly, the illustrated embodiment includes 8 integral fasteners 30 received and captured in 8 cooperating retention features 22. A smaller or larger number may be provided if desired. All such modifications and variations are within the scope of the appended claims when interpreted in accordance with the breadth to which they are fairly, legally and equitably entitled.

What is claimed:

1. An armrest assembly, comprising:
a unitary armrest subassembly including a support substrate, having a receiver and a retention feature, and a resilient web extending across said receiver and having an integral fastener captured in said retention feature;
a cushion overlying said resilient web; and
a coverstock concealing said cushion and said resilient web and closing said receiver;
wherein said receiver includes (a) an inset shoulder, said inset shoulder outlining a relief opening, and (b) a plurality of tabs project from said inset shoulder into said relief opening.

2. The armrest assembly of claim 1, wherein said retention feature is carried on said plurality of tabs.

3. The armrest assembly of claim 2, wherein said integral fastener comprises a shaft and an enlarged head, said retention feature engaging said shaft.

4. An armrest subassembly, comprising:
a support substrate having a receiver and a retention feature wherein said receiver includes (a) an inset shoulder, said inset shoulder outlining a relief opening, and (b) a plurality of tabs projecting from said inset shoulder into said relief opening; and
a resilient web extending across said receiver and having an integral fastener captured in said retention feature.

5. The armrest subassembly of claim 4, wherein said retention feature is carried on said plurality of tabs.

6. The armrest subassembly of claim 5, wherein said integral fastener comprises a shaft and an enlarged head, said retention feature engaging said shaft.

* * * * *